US007246961B2

(12) United States Patent
Gilmour

(10) Patent No.: US 7,246,961 B2

(45) Date of Patent: Jul. 24, 2007

(54) PRINTER SYSTEM AND SOFTWARE FOR ADHESIVE LABELS

(76) Inventor: Daniel A. Gilmour, 87 Westmont St., West Hartford, CT (US) 06117

( * ) Notice: Subject to any disclaimer, the term of this patent is extended or adjusted under 35 U.S.C. 154(b) by 0 days.

(21) Appl. No.: 11/374,544

(22) Filed: Mar. 13, 2006

(65) Prior Publication Data

US 2006/0204309 A1 Sep. 14, 2006

Related U.S. Application Data

(60) Provisional application No. 60/661,285, filed on Mar. 11, 2005.

(51) Int. Cl.
*B41J 11/00* (2006.01)
*B29C 65/00* (2006.01)
*B32B 37/00* (2006.01)

(52) U.S. Cl. ....................... 400/621; 156/257; 156/258

(58) Field of Classification Search ................ 156/257, 156/268, 272.2, 258; 400/621, 124.07
See application file for complete search history.

(56) References Cited

U.S. PATENT DOCUMENTS 4,129,390 A 12/1978 Bigelow et al. ............ 400/121
4,381,688 A * 5/1983 Hardy ......................... 83/887
4,770,552 A 9/1988 Nishijima et al. .......... 400/121
4,879,457 A 11/1989 Ludden ...................... 235/487
4,970,600 A 11/1990 Garnier et al. ............. 358/299
4,985,780 A 1/1991 Garnier et al. ............. 358/299
6,103,989 A * 8/2000 Jennings et al. ....... 219/121.67
6,191,382 B1 * 2/2001 Damikolas ............ 219/121.62
6,673,160 B2 1/2004 Stathem et al. ................ 134/6
6,685,313 B2 2/2004 Scofield et al. ............. 347/105
6,793,304 B2 9/2004 Kasahara ....................... 347/5
6,793,319 B2 9/2004 Ikemoto et al. ............... 347/40
2002/0063879 A1 * 5/2002 Zeman ...................... 358/1.14
2004/0101648 A1 * 5/2004 Mulvey et al. ............ 428/42.3

FOREIGN PATENT DOCUMENTS

JP 2000-225738 * 8/2000
JP 2001-261216 * 11/2001

* cited by examiner

*Primary Examiner*—Daniel J. Colilla
*Assistant Examiner*—Marissa Ferguson-Samreth
(74) *Attorney, Agent, or Firm*—Cantor Colburn LLP

(57) ABSTRACT

The disclosed apparatus relates to a printer for connecting to a computer, the printer comprising, a cutting mechanism for cutting media fed into the printer, wherein the printer receives instructions from software stored in the computer regarding location of cut lines for cutting the media.

5 Claims, 8 Drawing Sheets

Draw the desired cut lines in the printer software to direct where the sticky backed paper will be cut.
Hi My Name Is
Jane Schmo
Hi My Name Is
Joe Schmo
Hi My Name Is
Jane Doe
Hi My Name Is
John Doe
Hi My Name Is
Jane Smith
Hi My Name Is
John Smith
Hi I Am Your Host
Dan Gilmour
100
102
104
106
108
110
112
114
116
118
120
2

PRINTER SYSTEM AND SOFTWARE FOR ADHESIVE LABELS

CROSS REFERENCE TO RELATED APPLICATIONS

This application claims priority to provisional application 60/661,285 filed on Mar. 11, 2005 incorporated herein in its entirety by reference.

BACKGROUND OF THE INVENTION

This invention relates to adhesive labels, and more particularly relates to a printer and related software application for allowing the shape of an adhesive label to be selectively chosen and cut.

Printing on labels has become very common in recent years as computers with databases of information that are convenient to print onto stickers have become more prevalent. Many people print labels for such things as address labels for holiday cards, or name badges for gatherings such as conventions, or labels for file folders or to print labels for CD's and DVD's as well as the jewel cases for these CD's and DVD's.

Most printers today can print on special label paper. However, the dimensions of the pre-cut labels have to be entered into the software to assure that the printing is done within the borders of each label. This often requires trial and error as the user learns where the printer thinks the borders of each label are, often resulting in wasting expensive label paper, ink, and time. And if a different size label is needed, the person must purchase additional pre-cut label paper even as the existing paper goes unused.

Certain companies sell pre-cut labels in hundreds of precut label shapes, sizes, and media. In addition to this large proliferation of precut label templates, they also provide software that helps consumers to align their text, clipart, graphics, etc. onto their label templates. Microsoft Word incorporates some of these templates to help a user to get the printing to fit the template correctly.

The pre-cut labels may not necessarily suit all purposes, however, and a user may envision alternate sizes and shapes for a particular application, however such alternate sizes and shapes may not be available. The only alternative for such a user is to hopefully find a pre-cut label that is big enough to be cut with scissors into the desired shape after it has been printed upon. The resulting label, however, may not look professionally made, and would be extremely difficult to replicate.

BRIEF SUMMARY OF THE INVENTION

The disclosed apparatus relates to a printer for connecting to a computer, the printer comprising, a cutting mechanism for cutting media fed into the printer, wherein the printer receives instructions from software stored in the computer regarding location of cut lines for cutting the media.

Further disclosed herein relates to a storage medium encoded with machine-readable computer program code for drawing cut lines to be sent to a printer, the storage medium including instructions for causing a computer to implement a method comprising, providing a command tool for insertion of a cut line, wherein the cut line includes a code which makes it distinguishable from indicia to be printed, providing a command tool for drawing the cut line, and sending a signal regarding location of the cut line, relative to a media to be printed, to a printer equipped within a cutting mechanism.

The disclosed system relates to a system for printing and cutting a sheet of adhesive backed paper, the adhesive backed paper including a top layer for receiving printed indicia, a bottom backing layer, and adhesive interposed between the top layer and the bottom backing layer, the adhesive adhering to the top layer and releasable from the backing layer. The system comprising, a printer, the printer including a cutting mechanism for cutting the top layer, and a storage medium encoded with machine-readable computer program code for drawing cut lines to be sent to the printer, the storage medium including instructions for causing a computer to implement a method comprising, providing a command tool for insertion of a cut line, wherein the cut line includes a code which makes it distinguishable from indicia to be printed, providing a command tool for drawing the cut line, and sending a signal regarding location of the cut line, relative to the adhesive backed paper, to the printer, wherein the printer receives instructions from the storage medium stored in a computer in communication with the printer regarding location of cut lines for cutting the top layer.

The above discussed and other features and advantages of the present invention will be appreciated and understood by those skilled in the art from the following description and drawings.

BRIEF DESCRIPTION OF THE DRAWINGS

Referring to the exemplary drawings wherein like elements are numbered alike in the several FIGS..

DETAILED DESCRIPTION OF THE INVENTION

Figures 1, 2:
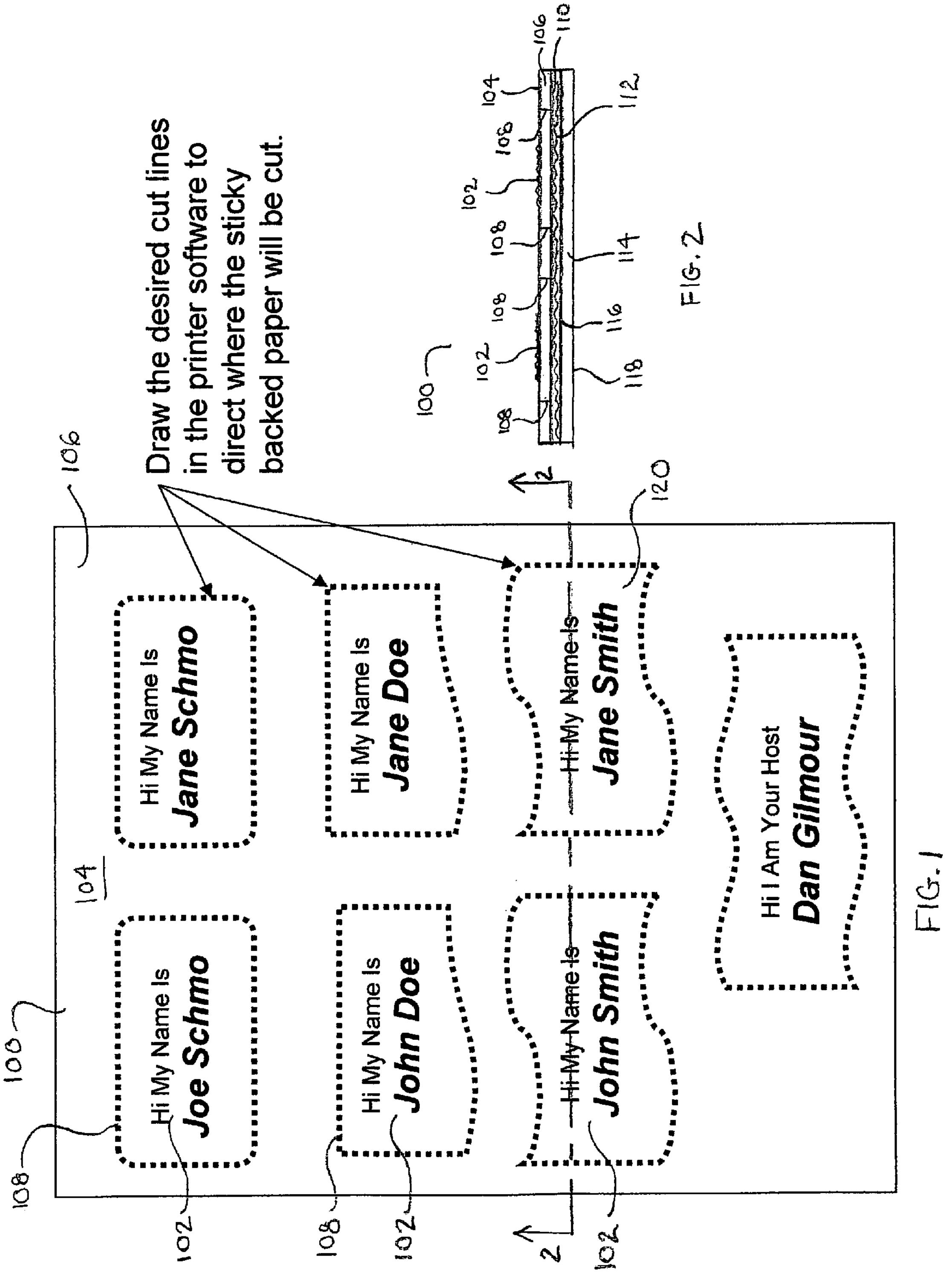
FIG. 1 is a top plan view of an exemplary printed and scored sheet of adhesive backed paper.
FIG. 2 is a cross-sectional view of the adhesive backed paper of FIG. 1 taken along line 2—2.

Turning to FIG. 1, an exemplary embodiment of an application of the printing and cutting system for adhesive backed paper is shown. A standard sheet of adhesive backed paper 100 is shown printed with indicia 102. The indicia 102 may be selectively different at different locations throughout a top surface 104 of a top layer 106 of the paper 100, and may include any sort of alphanumeric indicia as well as any other lines, drawn images, pictures, photos, clip art, etc. A user of the printing and cutting system may, at any time during the preparation of the paper 100, choose to draw cut lines 108. The cut lines 108 may be drawn to surround the already typed or inserted indicia 102, or may be drawn prior to preparation of the indicia 102. As shown in the exemplary embodiment of FIG. 1, the cut lines 108 may be drawn in any shape and form. While it is assumed that most users would include cut lines 108 drawn in a closed form shape such that a removable sticker is formed as shown in FIG. 1, the printing and cutting system may enable any cut lines 108 to be drawn.

While FIG. 1 only shows a top surface 104 of the top layer 106 of the paper 100, FIG. 2 shows a cross-sectional view taken along line 2—2 from FIG. 1. As shown in FIG. 2, the cut lines 108 extend all the way through top layer 106, but need not extend through bottom layer 114. Limiting the cut lines 108 through top layer 106 eases the removal of the label from a remainder of the paper 100. Bottom layer 114 includes a top surface 116 facing the bottom surface 110 of the top layer 106, and a bottom surface 118 forming the bottom surface of the paper 100. Interposed between the top layer 106 and the bottom layer 114 is adhesive 112 that adheres to the bottom surface 110 of the top layer 106. When a shape, e.g. 120, is removed from the bottom layer 114, the adhesive 112 and the shape 120 will be usable as a sticker.

Figure 3:
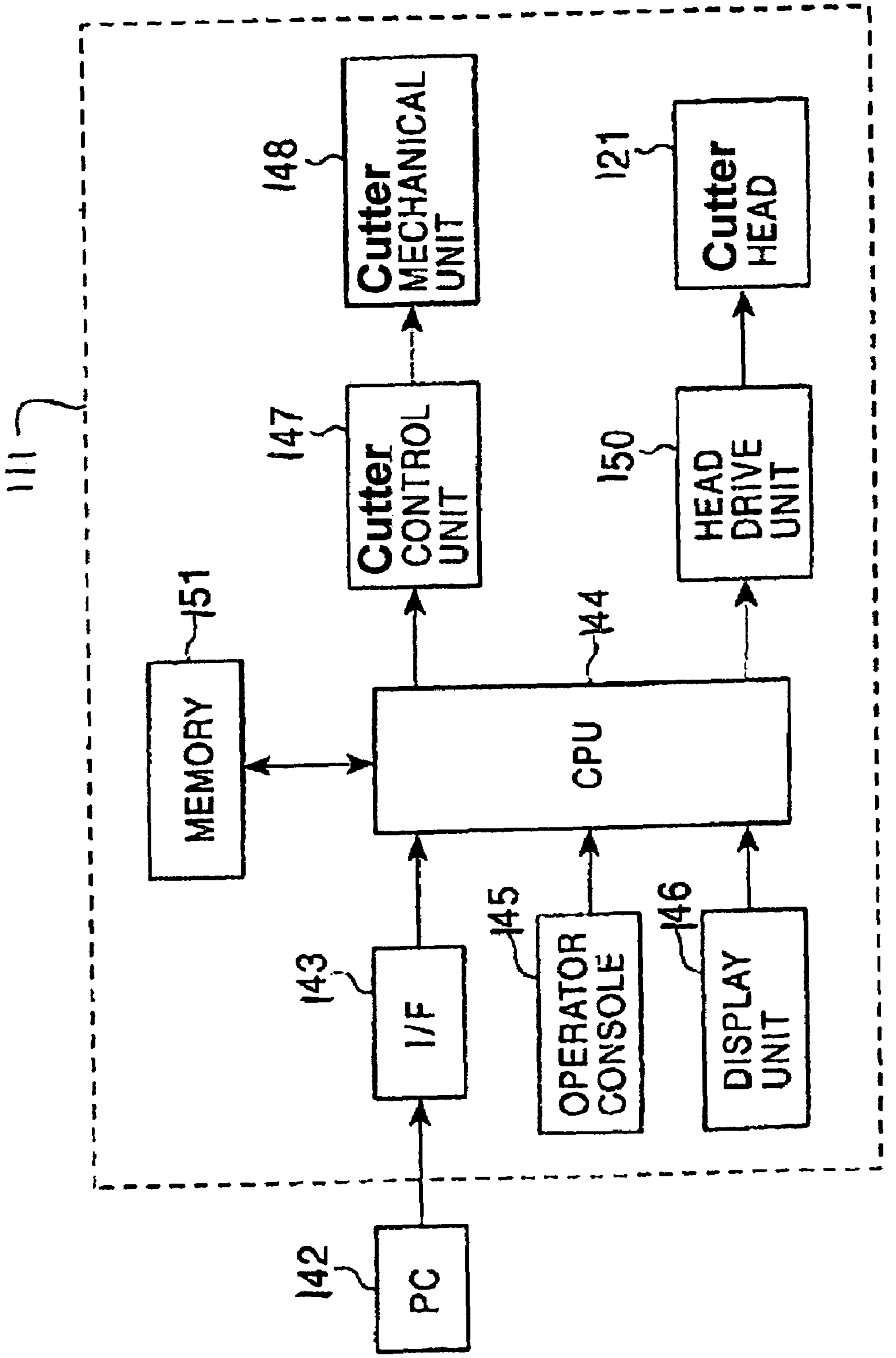
FIG. 3 is a block diagram of an exemplary line and cutting printer.

Referring now to FIG. 3, a block diagram of an exemplary line and cutting printer for creating the cut lines 108 is shown. By "printer" it should be understood that what is being printed may be text, such as indicia 102, as well as cut lines 108. It should be further understood that the application of ink to print text and other images onto the adhesive backed paper 100 may occur in a standard fashion known in the art in printers, and is therefore not fully described herein. The printer 111 may include these standard text printing functions in addition to the cutting functions described herein. In the printer 111, the interface (I/F) 143 receives control commands, cutting data and image data from the host system, personal computer 142, and sends them to the central processing unit (CPU) 144. The console 145 may be a pressing-button console attached to the printer 111. In the printer 111, by operating the console 145, instructions may be accepted for example, setting various printing and cutting positions, testing print and so on. The display unit 146 comprises the liquid-crystal panel attached to the console panel, and, in response to the operations of the console 145, it can be used to display menus for various settings and the detailed information.

The printer and cutter mechanical unit 148 may include a paper-feeding mechanism of the printer 111 as is known in the art, such as shown in U.S. Pat. No. 6,793,319 to Ikemoto et al. incorporated herein by reference in its entirety. Although one exemplary paper feeding mechanism is disclosed, it should be understood that alternate paper feeding mechanisms are within the scope of this invention. It would be within the scope of this printing and cutting system to utilize any feeding mechanism including top fed, self fed, bottom fed, tray fed, back fed, etc. and that the system disclosed herein should not be limited to any type of feeding mechanism.

The printer and cutter control unit 147 may control the printer and cutter mechanical unit 148 under the control of the central processing unit 144. The head drive unit 150 may include the drive circuit for driving each head chip of a line head of the printer or cutter under the control of the central processing unit 144. By these units, the printer 111 may drive the line head of the printer and/or cutter while feeding printable media to enable printing an image 102 or cutting a line 108 under the control of the central processing unit 144 in accordance with the output data from the personal computer 142.

The central processing unit 144 may include the controller together with the memory 151 to control actions of the printer 111. The unit 144 analyzes the control commands which may be input via the interface 143, and processes text data, image data, and cutting data based on the analysis result to control the printer and cutter controller 147 and the head drive unit 150. Thus, text data and image data, e.g. indicia 102 may be printed, and/or the cut lines 108 may be cut. The cutting and text printing may occur simultaneously, or, alternatively, the text printing may occur in a first step, and then the paper 100 may be re-fed into the printer 111 for "printing" the cutting lines 108.

The indicia 102 prepared on the personal computer 142 may be prepared using any known software application including, but not limited to, word processing applications, spreadsheet applications, drawing applications, and any importation of clip art or photos into any software application. The software application usable for the cutting and printing system disclosed herein may include any features known in the preparation of printable indicia, or alternatively such indicia may be imported into the cutting and printing software application.

Figure 4:
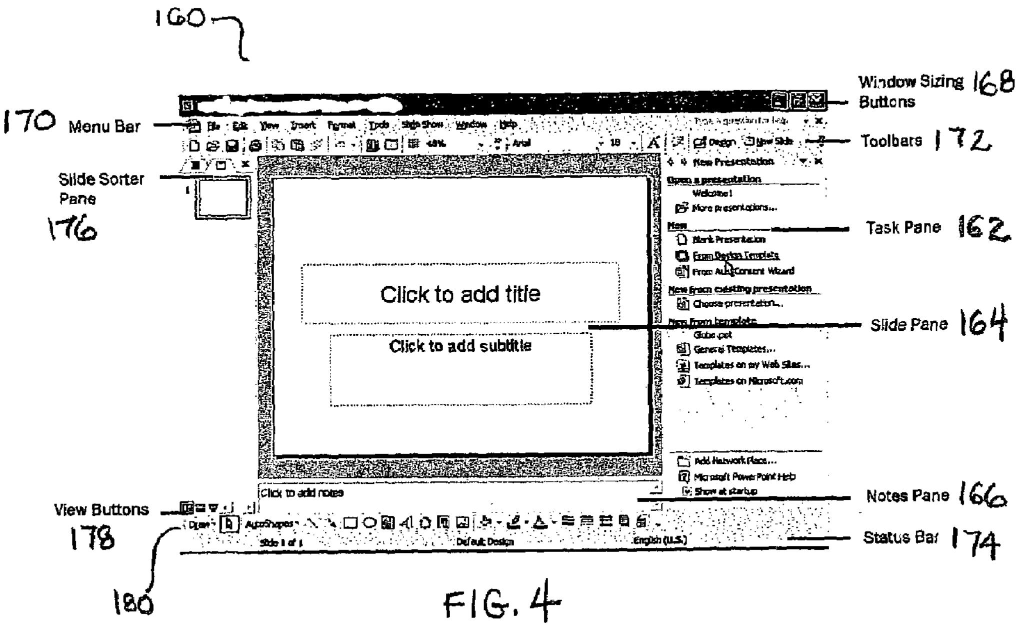
FIG. 4 is an exemplary screen shot for a printing and cutting software application.

The cutting and printing software application for preparing the cutting lines 108 may resemble any known application as described above with reference to the preparation of indicia 102, such as any application that includes a toolbar for drawing lines. As shown in FIG. 4, a screen shot 160 of an exemplary cutting and printing software application that includes text preparation and drawing features is shown. The screen shot 160 may include a tri-pane view including a task pane 162, a slide pane 164, and a notes pane 166. All three panes need not be simultaneously viewable. The screen shot 160 may also include window sizing buttons 168, a menu bar 170, toolbars 172, and a status bar 174. If several sheets are being prepared, they may be organized as slides, such as is usable in presentation software applications, and may be viewed in a slide sorter pane 176. The organization of the viewable screen shot 160 may be altered using view buttons 178. While a presentation software application is used as an exemplary model for the printing and cutting software application, it should be understood that alternate programs that utilize a drawing toolbar, or that may incorporate a drawing toolbar, may also be used as a basis for the printing and cutting software application.

The preparation of indicia 102, whether within the cutting and printing software application demonstrated in screen shot 160, or whether imported from another application, may be accomplished in any manner that is well known in the art. When it is desired to prepare cut lines 108, either before or after the introduction of indicia 102, the cutting and printing software application may be notified by the user that such cut lines 108 will be prepared. Such notification may occur using a drop-down menu from the menu bar 170. While any suitable language may be used, the words "insert cut lines", by example only, may be provided within one of the drop down menus. While any of the menu choices may include such a notification command, two of the more likely candidates include "Insert" and "Tools". By clicking on the notification command, the software application is directed to note that the following insertion is not indicia to become printed text, but is instead lines to be cut using the cutter head 121. The software application may use some indication on the monitor that the lines inserted after clicking "insert cut lines" are cut lines 108 rather than printable indicia 102. Such indication, which may be selectable by a user of the software application, may be flashing lines, dotted lines, colored lines, etc. Thus, when a user is inserting cut lines 108, there will be no confusion as to what is a cut line 108 and what is indicia 102. When clicking on "insert cut lines", a dialog box may open up which allows a user to choose between various options regarding the creation and symbolization of the cut lines 108.

Figure 5:
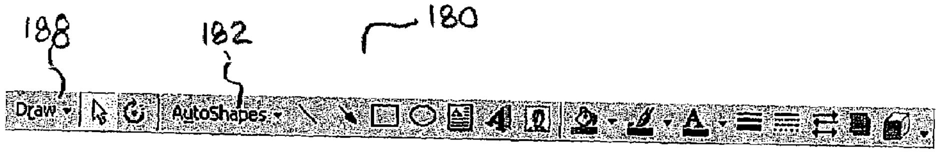
FIG. 5 is an enlarged view of the drawing toolbar from the screen shot of FIG. 4.

For preparing the cut lines 108, a drawing toolbar 180 may be used, an enlarged view of which is shown in FIG. 5. The drawing toolbar 180 may be used for both the preparation of indicia 102 and the preparation of cut lines 108. That is, the drawing toolbar 180 may contain tools to incorporate objects into the indicia 102, and when the cut lines 108 are to be prepared, a user may click on the notification command and may begin using the drawing toolbar 180 to create the cut lines 108. The software application may either automatically revert to the preparation of indicia 102 when a drawing line prepared using the drawing toolbar 180 is completed, or may alternatively require the user to click on an "end cut lines" command within either the drop down menu from the menu bar 170, or within the "cut lines" dialog box that opens up when clicking on a notification command within one of the drop down menus.

Figure 6:
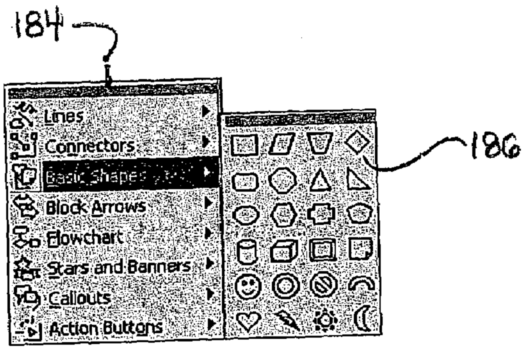
FIG. 6 is a drop-down menu for the Autoshapes tool from the drawing toolbar of FIG. 5.

Not all of the typical tools found in a drawing toolbar 180 would be sensible for the preparation of cut lines 108, and therefore some of the tools, such as paint, color choices, word art, etc. may become disabled after clicking on the notification command to insert cut lines. The "AutoShapes" menu item 182 may include some suitable exemplary tools, as shown in drop down menu 184 shown in FIG. 6, for the preparation of cut lines 108. For example, the "Basic Shapes" choices, shown in menu 186, may include some standard shapes that may be usable to form the shape 120 that will surround the indicia 102. Once a basic shape is chosen, the "Draw" menu item 188 in the toolbar 180 may be selected to alter a selected autoshape. A more individualized shape 120 may be created by selecting "lines" from the menu 184 and then selecting "freeform" from the "lines" menu (not shown). A shape 120 of selectable dimensions may be created by starting and ending at the same point. The shape 120, once completed, may be copied to surround other indicia, or a brand new shape 120 may be created. It should be understood that the creation of the cut lines 108 using toolbar 180 will have infinite possibilities, and therefore a user will benefit from not being restricted to standard forms provided by label manufacturers, as well as benefit from not having to use the same shape 120 over and over again, although individual shapes 120 that are desirable are easily repeatable using a copy and paste feature of the application. Furthermore, with the software application allowing a user to visualize both the cut lines 108 and the indicia 102 on the screen simultaneously, a user can immediately be assured that the indicia 102 will fall within the boundaries of the cut lines 108 prior to sending the results to the printer.

Another useful embodiment of this system is to make alphanumeric characters. It is common to purchase stickers of the letters of the alphabet and the numbers from 0 through 9, for purposes of sign making, arts and crafts, etc. These alphanumeric sets are available in a variety of colors, sizes and fonts, and in capital as well as lower case letters. It is also common for these sets to have multiple copies of each letter with more copies of letters that are more frequently used. In order to assure that the user will have all the letters they need they must count how many of each letter, capital and lower case, that they will be using, then check this against the contents of the packages they are buying to assure they have enough of each digit. It is inevitable that many, if not most, of the letters purchased will not actually be used, resulting in a waste of money and materials. Using these letters is still tedious since several pages need to be searched through to find each letter before peeling off and sticking where desired. The present system will allow the letters and numbers to be created in the software in the size, color, font, case and order desired before printing and cutting them. The user then can simply peel and stick.

Figure 7:
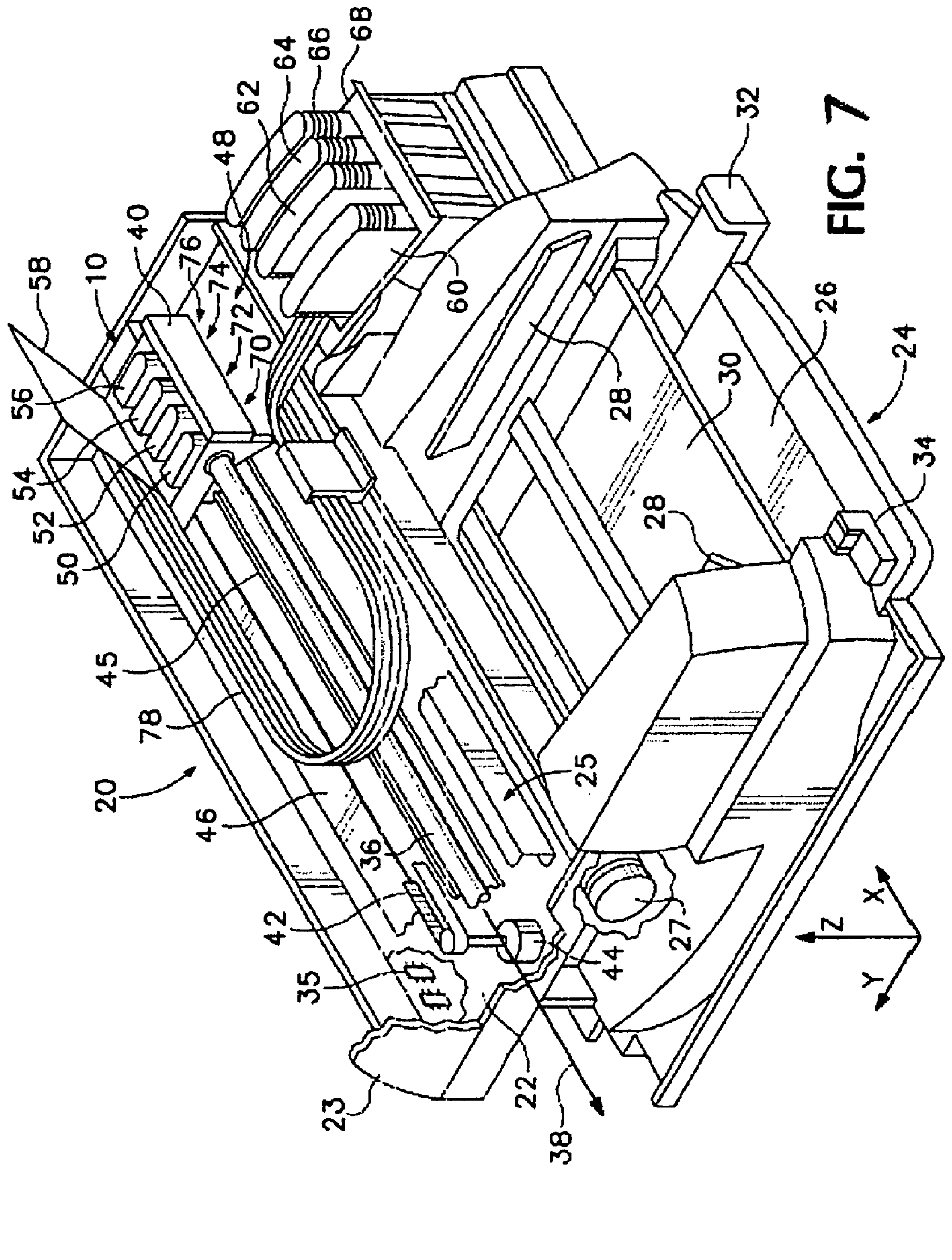
FIG. 7 is a fragmented perspective view of one form of an inkjet printing mechanism, here an inkjet printer, for use with a chemical cutter.

The process by which the cut lines 108 are formed by the printer 111 may be accomplished using a variety of methods and systems. In one example, a printer that deposits a chemical upon the adhesive backed paper 100 may be arranged in a similar manner as a printing apparatus, such as an inkjet printer, for feeding a printing medium relative to a printing head having an array of printing elements, during a printing operation. The printing medium may be replaced by a suitable chemical for cutting at least the top layer 106, but preferably not the backing sheet, bottom layer 114, although cutting through both layers may also be within the scope of this system. The chemical may be an acid that eats through the top layer 106. In another embodiment, the chemical may be one that is deposited upon the top layer 106, and when the top layer 106 is exposed to light, a chemical etching takes place. In either case, at least the top layer 106 may be scored by the chemical at the cut lines 108 defined by the software application. An exemplary system for depositing ink is shown in FIG. 7, and fully described in U.S. Pat. No. 6,793,304 to Kasahara as an inkjet system, which is herein incorporated by reference in its entirety. With reference to the printing and cutting system disclosed herein, an inkjet system may also be used for depositing chemicals for use in cutting by incorporating at least one extra cartridge that holds a cutting chemical, similar to the ink-holding cartridges of standard inkjet systems. Although one exemplary inkjet system is disclosed, it should be understood that alternate embodiments of an inkjet system may also be modified to house chemicals used for the cutting apparatus of this system.

FIG. 7 illustrates an embodiment of an inkjet printing mechanism, here shown as an inkjet printer 20, which may be used for printing any type of document, including printing on adhesive backed labels. A variety of inkjet printing mechanisms are commercially available. For instance, some of the printing mechanisms that may embody the herein described system may include plotters, portable printing units, copiers, cameras, video printers, facsimile machines, etc. While a specific embodiment of an inkjet printer is described, it should be understood that other embodiments of inkjet mechanisms are within the scope of the herein described systems.

While printer components may vary from model to model, the inkjet printer 20 may include a chassis 22 surrounded by a housing or casing enclosure 23, the majority of which has been omitted for clarity in viewing the internal components. A print media handling system 24 feeds sheets of print media through a printzone 25. The print media may be any type of suitable sheet material, such as paper, card-stock, envelopes, fabric, transparencies, mylar, etc. and for the purposes of the herein described systems, the print media may also include adhesive-backed paper 100. The print media handling system 24 has a media input, such as a supply or feed tray 26 into which a supply of media is loaded and stored before printing and/or, for the purposes of this system, cutting. A series of conventional media advance or drive rollers (not shown) powered by a motor and gear assembly 27 may be used to move the print media from the supply tray 26 into the printzone 25 for printing. After printing (and cutting), the media sheet may then land on a pair of retractable output drying wing members 28, shown extended to receive the printed sheet. The wings 28 momentarily hold the newly printed sheet above any previously printed sheets still drying in an output tray portion 30 before retracting to the sides to drop the newly printed sheet into the output tray 30. The media handling system 24 may include a series of adjustment mechanisms for accommodating different sizes of print media, including letter, legal, A-4, envelopes, etc. To secure the generally rectangular media sheet in a lengthwise direction along the media length, the handling system 24 may include a sliding length adjustment lever 32, and a sliding width adjustment lever 34 to secure the media sheet in a width direction across the media width.

The printer 20 also has a printer controller, illustrated schematically as a microprocessor 35, that receives instructions from a host device, typically a computer, such as a personal computer 142. Indeed, many of the printer controller functions may be performed by the host computer, by the electronics on board the printer, or by interactions therebetween. As used herein, the term "printer controller 35" encompasses these functions, whether performed by the host computer, the printer, an intermediary device therebetween, or by a combined interaction of such elements. A monitor coupled to the computer host may be used to display visual information to an operator, such as the printer status or a particular program being run on the host computer, including the printing and cutting software application disclosed herein as exemplified by screen shot 160 shown in FIG. 4. Personal computers, their input devices, such as a keyboard and/or a mouse device, and monitors are all well known to those skilled in the art.

The chassis 22 supports a guide rod 36 that defines a scan axis 38 and may slidably support an inkjet printhead carriage 40 for reciprocal movement along the scan axis 38, back and forth across the printzone 25. For the purposes of this system, the carriage 40 may also include a cutting chemical in addition to the ink. The carriage 40 is driven by a carriage propulsion system, here shown as including an endless belt 42 coupled to a carriage drive DC motor 44. The carriage propulsion system also has a position feedback system, such as a conventional optical encoder system, which communicates carriage position signals to the controller 35. An optical encoder reader may be mounted to carriage 40 to read an encoder strip 45 extending along the path of carriage travel. The carriage drive motor 44 then operates in response to control signals received from the printer controller 35. A conventional flexible, multi-conductor strip 46 may be used to deliver enabling or firing command control signals from the controller 35 to the printhead carriage 40 for standard printing and/or cutting, as described further below in a printing and cutting system disclosed herein.

The carriage 40 is propelled along guide rod 36 into a servicing region 48, which may house a service station unit (not shown) that provides various conventional printhead servicing functions. To clean and protect the printhead, typically a "service station" mechanism is mounted within the printer chassis so the printhead can be moved over the station for maintenance. For storage, or during non-printing periods, the service stations usually include a capping system, which hermetically seals the printhead nozzles from contaminants, and drying. Some caps are also designed to facilitate priming by being connected to a pumping unit that draws a vacuum on the printhead. During operation, clogs in the printhead are periodically cleared by firing a number of drops of ink or chemical through each of the nozzles in a process known as "spitting" with the waste ink being collected in a "spittoon" reservoir portion of the service station. After spitting, uncapping, or occasionally during printing, most service stations have an elastomeric wiper that wipes the printhead surface to remove ink residue, as well as any paper dust or other debris that has collected on the printhead.

In the printzone 25, the media receives ink from an inkjet cartridge, such as a black ink cartridge 50 and three monochrome color ink cartridges 52, 54, 56, secured in the carriage 40 by a latching mechanism 58, shown open in FIG. 7. The cartridges 50–56 are also commonly called "pens" by those in the industry. The inks dispensed by the pens 50–56 may be pigment-based inks, dye-based inks, or combinations thereof, as well as paraffin-based inks, hybrid or composite inks having both dye and pigment characteristics. Although not shown, the carriage 40 in a printing and cutting system disclosed herein may further include a chemical cartridge that is filled with a cutting chemical such as an acid that eats through the adhesive backed paper layer 106 or a pair of chemical cartridges that when their chemicals are combined on the surface of the adhesive backed paper create an acid that eats through the top layer, or a chemical that may be deposited upon the adhesive backed paper layer 106, such that when the paper layer 106 is exposed to light or other means of radiated energy, a chemical etching takes place. It is also within the scope of this invention to incorporate any type of chemical that, when applied to the paper layer 106, will score the paper layer 106 along cut lines 108. Also, while the carriage 40 is disclosed as holding a cutting chemical within a chemical cartridge, it should be understood that a chemical cartridge may be held within a carriage separate from the carriage 40.

The illustrated pens 50–56 each include reservoirs for storing a supply of ink therein. The reservoirs for each pen 50–56 may contain the entire ink supply on board the printer for each color, which is typical of a replaceable cartridge, or they may store only a small supply of ink in what is known as an "off-axis" ink delivery system. The replaceable cartridge systems carry the entire ink supply as the pen reciprocates over the printzone 25 along the scanning axis 38. Hence, the replaceable cartridge system may be considered as an "on-axis" system, whereas systems which store the main ink supply at a stationary location remote from the printzone scanning axis are called "off-axis" systems. In an off-axis system, the main ink supply for each color is stored at a stationary location in the printer, such as four refillable or replaceable main reservoirs 60, 62, 64, 66, which are received in a stationary ink supply receptacle 68 supported by the chassis 22. Although not shown, the supply receptacle 68 may also include a reservoir of a cutting chemical. The pens 50, 52, 54, and 56 have printheads 70, 72, 74, and 76, respectively, which eject ink delivered via a conduit or tubing system 78 from the stationary reservoirs 60–66 to the on-board reservoirs adjacent the printheads 70–76. Although not shown, there may also be a cutter head 121 adjacent the printheads 70–76, and the cutting chemical may be ejected through the cutter head 121 in a manner similar to the ejection of ink through the printheads 70–76. The cutting chemical may also be delivered via the conduit or tubing system 78 from a stationary reservoir in the supply receptacle 68, or within a receptacle separate from the supply receptacle.

The printheads 70–76 each have an orifice plate with a plurality of nozzles formed therethrough in a manner well known to those skilled in the art. The nozzles of each printhead 70–76 typically formed in at least one, but typically two linear arrays along the orifice plate, aligned in a longitudinal direction perpendicular to the scanning axis 38. The illustrated printheads 70–76 are thermal inkjet printheads, although other types of printheads may be used, such as piezoelectric printheads. The thermal printheads 70–76 typically include a plurality of resistors that are associated with the nozzles. Upon energizing a selected resistor, a bubble of gas is formed which ejects a droplet of ink from the nozzle and onto a sheet of media in the printzone 25 under the nozzle. The printhead resistors are selectively energized in response to firing command control signals received via the multi-conductor strip 46 from the controller 35. The cutter head 121 may be formed in a similar manner as previously described for the printheads 70–76. A media sensor 10 may be supported by the printhead and cutterhead carriage 40 in a variety of different ways known to those skilled in the art.

Figure 8:
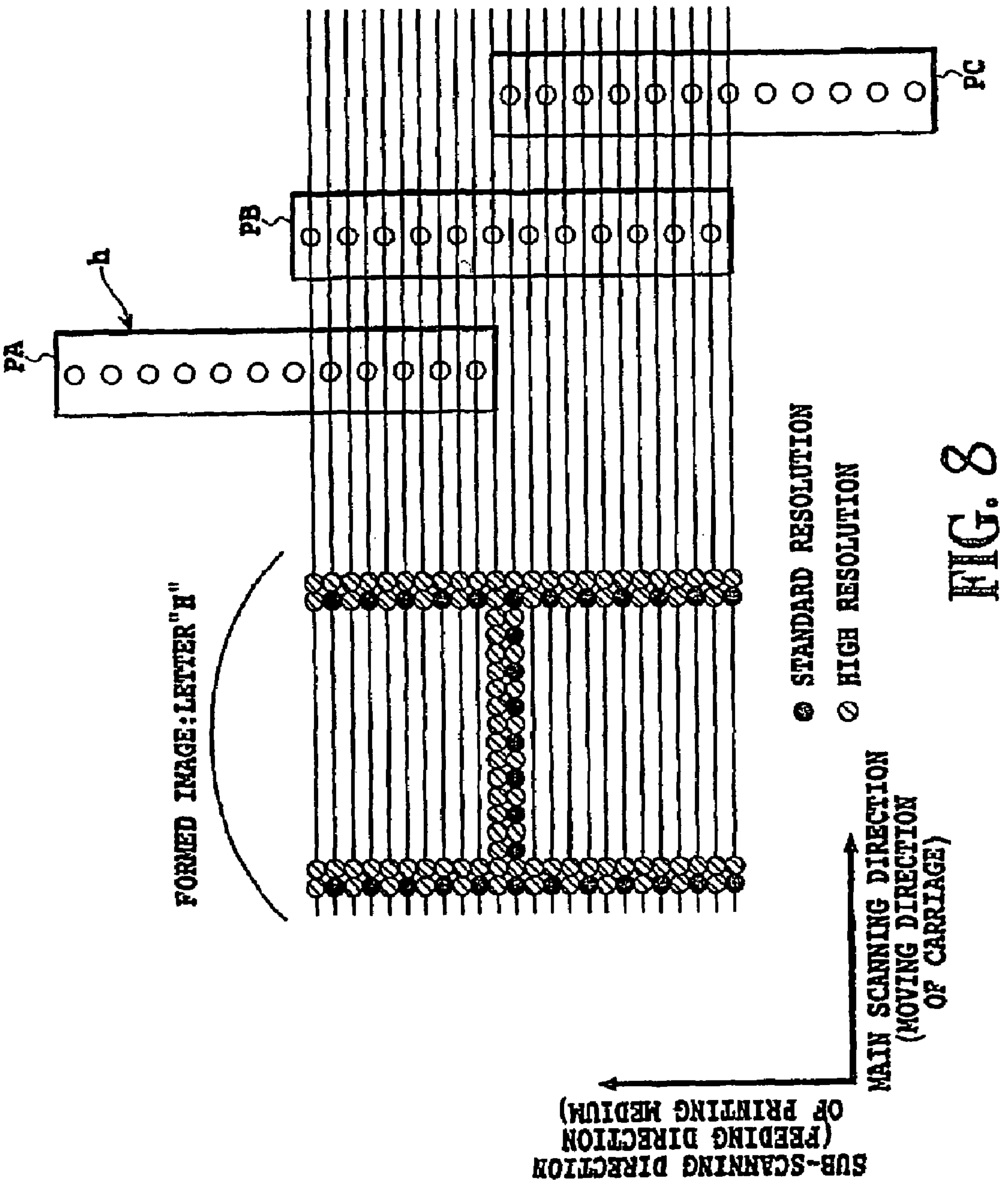
FIG. 8 is an image of the letter H formed by three successive scans.

To understand how a cutting chemical may be used to cut (score) a line 108 through the adhesive backed paper 100, it should first be understood how ink is delivered to media to form printed images. Turning now to FIG. 8, as shown in U.S. Pat. No. 6,793,304, this figure illustrates how a high resolution image of a letter "H" is formed by a printing head h by changing its relative position in the sub-scan direction and performing three main scans (carriage movements) over the same area of the printing medium. Although in the figure the printing head h is shown to have 12 nozzles arranged in a direction matching the sub-scan direction (printing medium feeding direction), the nozzles may be arranged otherwise, for example, in a direction at an angle to the sub-scan direction. It is also noted that the number of the nozzles is not limited to that shown in the example.

In the example shown, during the normal or standard printing in which the nozzle pitch is used as the print resolution, a first main scan (pass PA) over the print area on the printing medium forms dots at positions indicated by black dots, thereby an upper half of the letter "H" is printed. Then, the printing medium is fed in the sub-scan direction by an amount equal to 12 times the nozzle pitch (12 dots, i.e. a total length of the nozzle array). A second main scan (pass PC) forms dots at positions indicated by black dots, thereby a remaining lower half of the letter "H" is printed to complete the image of the letter "H".

To realize a resolution two times higher than the nozzle pitch, a pass PB is interposed between the normal passes PA and PB and the following control is performed. First, the first main scan or pass PA is carried out to form dots at positions indicated by black dots covering the upper half of the letter "H". Then the printing medium is fed in the sub-scan direction by an amount equal to (6+½) dots to situate the nozzles of the printing head h at centers between the standard resolution dot formation positions. Then, a second main scan or pass PB prints interpolated data for high resolution in the sub-scan direction (in the letter "H" the interpolated dots are indicated by hatched dots adjacent in the sub-scan direction to the standard resolution position black dots). After this, the printing medium is fed in the sub-scan direction by an amount equal to (5+½) dots. Then, a third main scan or pass PC forms dots at the standard resolution positions indicated by black dots covering the lower half of the letter "H" to complete the image. In each of the passes PA, PB and PC, the ejection frequency of the nozzles during the main scan is doubled to form dots to realize the two times higher resolution in the main scan direction (those dots shown hatched and located adjacent in the main scan direction to the standard resolution position dots and the interpolated position dots).

Figure 9:
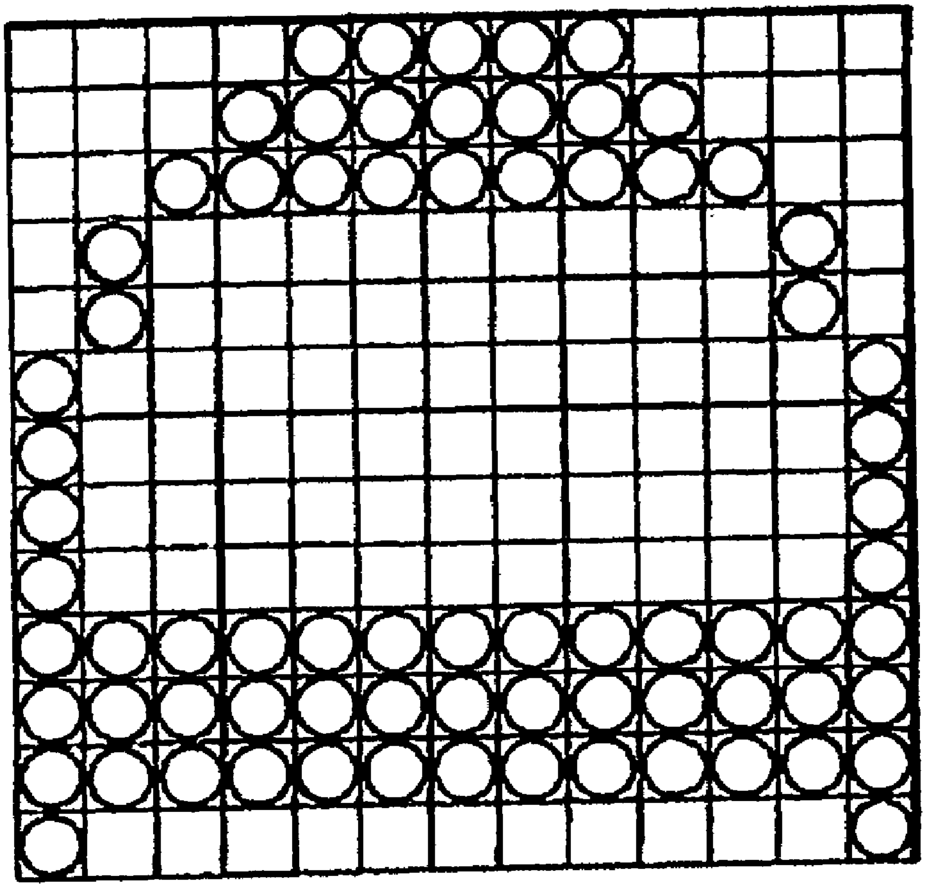
FIG. 9 is an image of the letter D formed by an inkjet printing process.

In another example regarding the application of dots to media, turning now to FIG. 9, a dot pattern of a letter "D" is shown. In this figure, the circles represent the dots to be printed to form letter "D". The piece of character data for letter "D" consists of "1" bits representing the dots, and "0" bits denoting blank spaces. One-line character data representing the dot-patterns of characters, which are similar to the dot-pattern shown in FIG. 9, is read out from a character generator and stored into a data buffer. The method and system for forming the dot pattern is fully described in U.S. Pat. No. 4,770,552 and is herein incorporated by reference in its entirety.

Using FIGS. 8 and 9 as examples, it should be understood that applying a cutting chemical may be the same, or similar, process used to apply ink dots. The "resolution" of the cutting chemical would define how clean the cut lines 108 are. A low resolution cut line 108 may appear slightly more jagged than a high resolution cut line 108. In either case, the selected form 120 should be releasable from a remainder of the top layer 106 when the cut lines 108 are made. The resolution of the cut line 108 may be selected via a dialog box regarding the formation of cut lines, as previously described.

While exemplary dot patterns in the shape of the letters "H" and "D" are shown in FIGS. 8 and 9, it should be understood that the dot pattern used in the printing apparatus and method of cutting adhesive backed paper layer would be dictated by the software controlled by the user for determining the shape of the dot pattern. Such a shape would most likely be that of a shape, either polygonal, freeform, or otherwise, most likely having a closed boundary for enclosing a set of characters, text lines, or other printed images. While a shape with a closed boundary is specifically disclosed, as that would enable a user to remove a sticker, shape 120, from the backing layer 114, it should be understood that any lines and curves may also be drawn with the software and deposited onto the adhesive-backed layer using the disclosed methods.

While the cutting mechanism has thus far been described as a chemical cutter, the cutting mechanism may also include a mechanical cutter. For example, the mechanical cutter may include a punch or blade system for poking a series of apertures through the adhesive-backed layer. The cutter may be a series of small blades that impact the top layer 106 creating short cuts that connect to form a continuous border such that the cut out shape 120 can be pulled from its backing 114. The finer and greater the number of apertures or cuts, the smoother the cut lines 108 will appear. The resolution of the cut lines 108 may be chosen via the dialog box viewable on a user's monitor connected to a computer storing the software application for the printing and cutting mechanism.

While any form of a mechanical cutter is within the scope of this system, one exemplary mechanical cutter may take the form of a stack of pivoted thin blades, each having a cutting tip at one end thereof. Such a mechanical cutter may be similar to a printer head that utilizes a stack of pivoted thin blades, each having a printing tip at one end thereof as shown in U.S. Pat. No. 4,129,390 to Bigelow et al. herein incorporated by reference in its entirety. When used for the printing and cutting system for adhesive backed paper, the printing tips of prior print heads may be replaced by cutting tips which may be pointier for cutting purposes.

Figure 10:
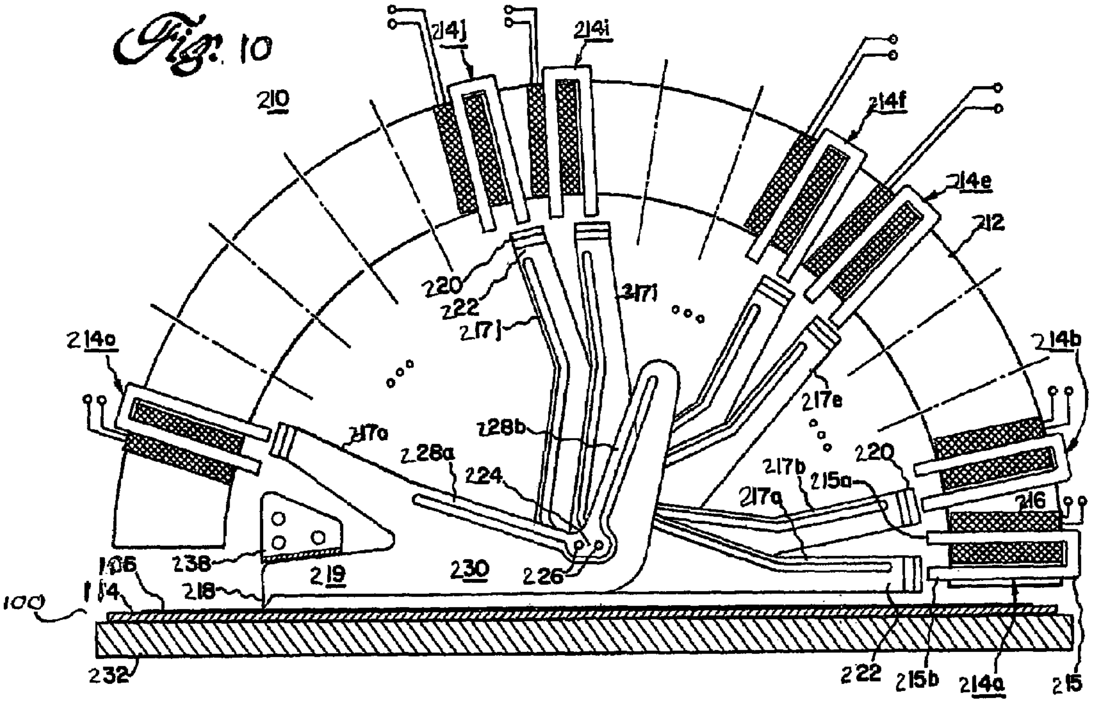
FIG. 10 is a side view of a high resolution embodiment of a stacked blade cutting head.
Figure 11:
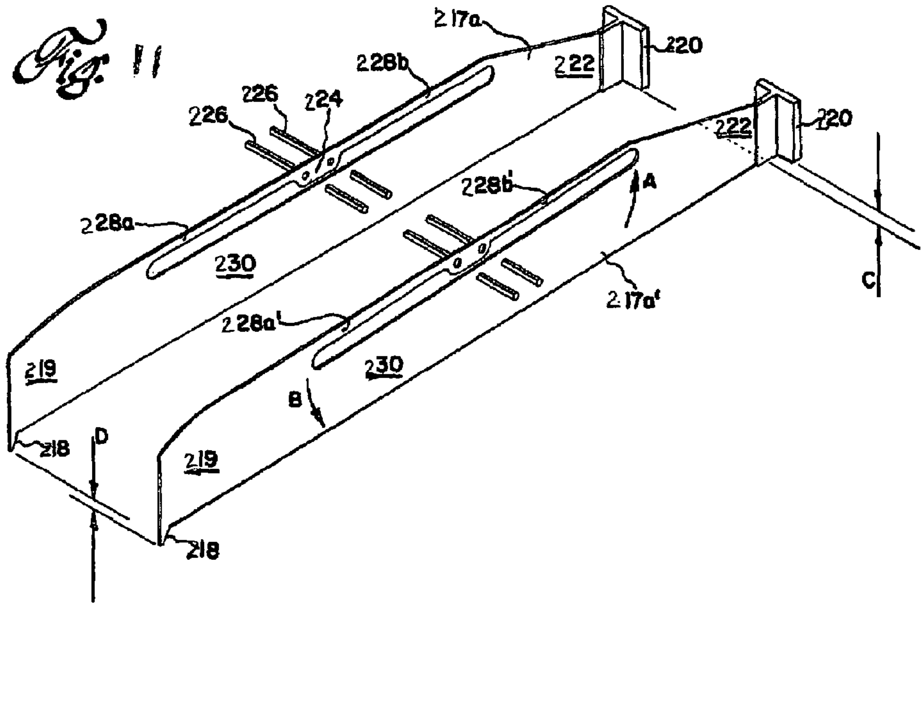
FIG. 11 is an isometric view of a cutting blade of FIG. 10 in the unenergized condition and in the energized condition; and, FIG. 12 is a schematic representation of a direction of a laser beam usable in the printing and cutting system of FIG. 3.

As shown in FIGS. 10–11, a high-resolution-capability stacked blade cutting head 210 comprises a semi-circular housing 212 having a plurality of magnetic means 214 mounted at equiangular positions thereabout. Each of magnetic means 214 includes a U-shaped pole piece 215 having a solenoid coil 216 around one leg thereof. A like plurality of cutter blades 217, illustratively being 15 in number, are each formed of a thin sheet of durable non-magnetic material, such as metal and the like, with each blade 217 having a cutting tip 218 extending downwardly at a first end 219 thereof. An armature 220, formed of a magnetic material, is attached at a second end 222 of each blade, adjacent an associated magnetic means 214. A fixed pivot portion 224, located substantially at the center of mass of each blade 217, is fixedly mounted to frame members (not shown for purposes of simplicity) at the center of housing 212 by means of a plurality of pins 226. Each blade member 217 includes a pair of elongated resilient spring arms 228*a*, 228*b* respectively extending in opposite directions from central portion 224 and spaced from a beam portion 230 of each blade along part of the length thereof. Arms 228*a*, 228*b* join beam portion 230 respectively at first end 219 and second end 222, respectively.

When the coil of the magnetic means 214 associated with a particular armature 220 (such as magnetic means 214*a* for the armature attached to blade 217*a*) is energized by a flow of current therethrough, the resulting magnetic field attracts armature 222 toward arm 215*a* to apply an upward torque, in the direction of arrow A, to the associated blade end 222. Each resilient spring arm 228*a* and 228*b*, respectively, bends in an opposite direction responsive to the applied torque to facilitate substantially frictionless rotation of the arm about its fixed pivot portion 224. As illustrated, the solenoid armature end 222 of each blade is positioned at a different angle with respect to aligned first ends 219 to accommodate the semi-circular positioning of magnetic means 214.

Cutting head 210 is positioned above a platen 232 which supports the adhesive backed paper 100, upon which symbols, characters and other indicia may be printed using conventional printing methods, and which may further be cut through the top layer 106, the top layer 106 supported by the bottom layer 114, with a layer of adhesive 112 (shown in FIG. 2) interposed therebetween for adhering to the top layer 106. When at least one magnetic means 214 is energized, the cutting tip 218 of the associated blade (or blades) 217 is thrust against the top layer 106 to leave a hole thereon.

In the resting condition, each cutting blade, typically illustrated by blade member 217*a*, has, in its deenergized (or "unflexed") condition, its cutting tip 218 positioned at a distance D above adhesive backed paper 100 as maintained by the unflexed elongated resilient spring arms 228*a* and 228*b*. Upon energization of the associated magnet means 214, magnetic armature member 220 is, as previously mentioned, drawn upwardly a distance C toward arm 215*a*, whereby torque is placed upon blade end 222 to rotate that end upwardly in a counterclockwise direction, as indicated by arrow A. As the beam 230 of each cutter blade is relatively wide and, therefore, stiff (whereas each resilient spring arm 228 is of sufficiently thin dimension to flex), first blade end 219 is caused to rotate downwardly, as indicated by arrow B, about fixed pivot portion 224 to cause cutting tip 218 to move through distance D and impact layer 106 leaving a hole therein. Upon deenergization of the associated magnet means 214, the energy stored in flexed resilient arms 228*a*', 228*b*' will produce a torque on blade 217 in a direction opposite arrows A and B to return the blade to its original unenergized position with armature 220 adjacent the remaining polepiece arm 215*b*. A stop member 238 (FIG. 10) is positioned at a height above platen 232 selected to bring the returning blade to a halt at its rest position without excessive bounce, which may (if not prevented) allow the blade to vibrate freely about pivot portion 224 upon deenergization of magnetization means 214, with subsequent cutting of a second hole.

While this embodiment allows a relatively large number, typically 15, of blades to be aligned for dot-matrix cutting of high resolution as required for reproduction of high quality cut lines, the relatively high mass and size of this configuration may place a relatively low cutting speed limitation thereon. Thus, it should be understood that alternate arrangements of cutting heads would be within the scope of the printing and cutting system disclosed herein.

Figure 12:
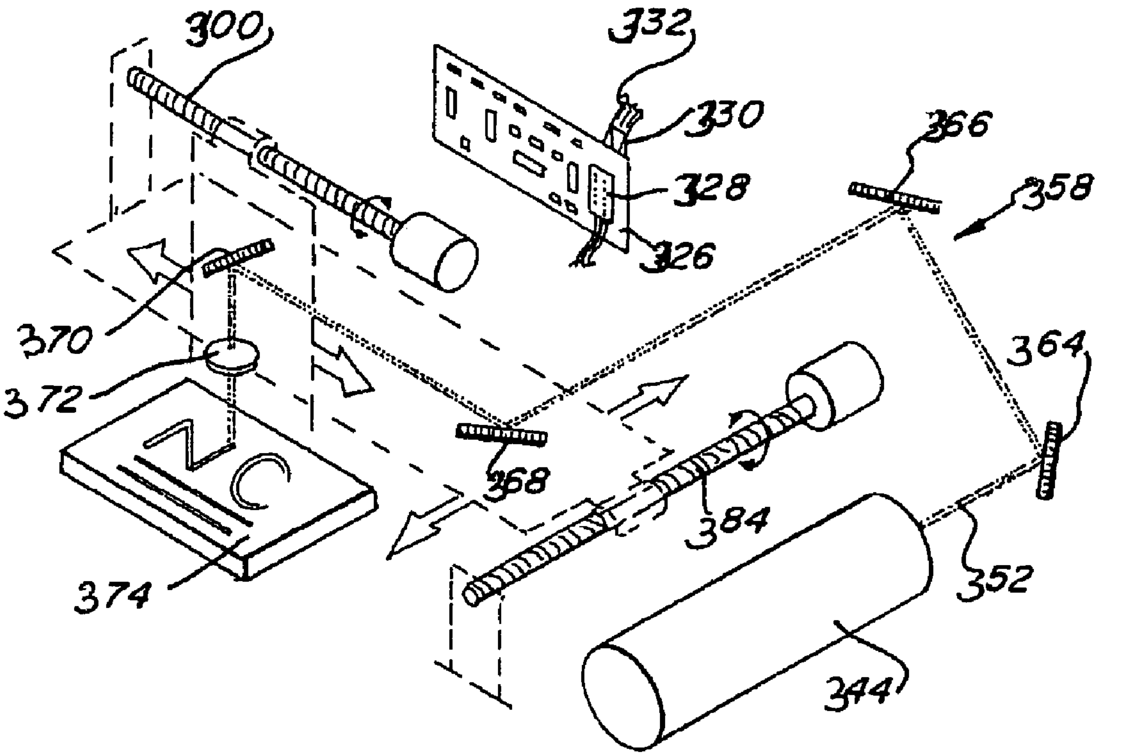

Yet another embodiment for the cutter within the printer 111 may include the incorporation of a laser, as shown in FIG. 12. Lasers that are usable for fine and directable cutting procedures may be mechanically positioned within printer 111 such that a laser beam is directed upon the top layer 106 at locations determined through the printing and cutting software application as cut lines 108. Electrical signals may be sent by the software application to the CPU 144, and then to the laser, such that the on/off status of the laser is electronically commanded by CPU 144 and may then further be moved mechanically is response to the command to ensure that the laser beam is accurately positioned for directing the laser beam at the proper locations, and for the determined time period.

While a specific embodiment of a laser for use in cutting within the printer 111 is described, it should be understood that alternate arrangements are within the scope of the printer 111. FIG. 12 shows a laser device 344 positioned within the printer 111, such as a fixed location within printer 111. The laser device 344 can be a commercially available laser, and is similar to the laser used within apparatus described within U.S. Pat. Nos. 4,970,600 and 4,985,780, both to Garnier et al., herein incorporated fully by reference in their entirety. The laser device 344 outputs a laser beam 352. The laser beam 352 is directed to a beam delivery system which includes a mirror arrangement 358, which is comprised of a number of mirrors, and a carriage assembly, which includes two carriages. The mirror arrangement 358 includes a first light reflecting mirror 364, which receives or communicates with the laser beam 352 outputted by the laser device 344. The mirror 364 is disposed substantially at a 45 degree angle relative to the laser beam 352 impinging thereon so as to direct the laser beam in a direction substantially perpendicular to the direction of the laser beam 352 outputted by the laser device 344. The laser beam 352 directed by the first mirror 364 is incident upon a second mirror 366, which is disposed substantially at a 45 degree angle relative to the laser beam 352, which impinges upon the second mirror 366. Upon receipt of the laser beam 352, the second mirror 366 causes the laser beam 352 to be directed substantially perpendicular to the direction of the laser beam between the first and second mirrors 364, 366. Consequently, the direction of the laser beam 352 from the second mirror 366 is substantially parallel to the direction of the laser beam 352 outputted by the laser device 344. A third mirror 368 receives the laser beam 352 directed by the second mirror 366 and is also disposed at a substantially 45 degree angle relative to the direction of the laser beam 352. As a consequence, the laser beam 352 is caused to be directed once again in a direction substantially perpendicular to the direction of the laser beam 352 outputted by the laser device 344. From the third mirror 368, the laser beam 352 is received by a fourth mirror 370. The fourth mirror 370 is disposed at a 45 degree angle to direct the laser beam 352 in a downward direction towards a support member where it is received by a lens 372. The lens 372 focuses the laser beam 352 and outputs or passes the laser beam 352 to a desired or predetermined position on a workpiece 374. As can be appreciated, the laser beam 352 causes a burning or cutting of the workpiece 374, particularly through the upper surface thereof.

In connection with positioning the laser beam 352 relative to the workpiece 374, the carriage assembly for the beam delivery system includes an X carriage and a Y carriage. The X carriage is used in moving a carrier of the carriage assembly in a selected one of first or positive and second or negative X directions. The X carriage includes a ball screw 384 located substantially vertically above the laser device 344 and substantially parallel to the length of the laser device 344. A ball nut operatively engages portions or threads of the ball screw 384 whereby rotation of the ball screw 384 relative to the ball nut causes the carrier to move. Rotation of the ball screw 384 is done by a first servomotor that includes an encoder for use in providing information concerning the position of the carrier. Rotation in a clockwise direction will cause the carrier to move in either a positive or negative X direction, while rotation in a counterclockwise direction will cause the carrier to move in the other of the positive or negative X direction. Like the X carriage, a Y carriage includes a ball screw 300 that is rotatable relative to a ball nut, where the ball nut is movable relative to the carrier for moving the fourth mirror in the desired position in the Y direction. Movement of the ball screw 300 is accomplished by coupling one end of the ball screw 300 to a second servomotor. Rotation of the ball screw in a predetermined one of a clockwise or counterclockwise direction results in a positive Y directional movement, and rotation in the opposite direction results in a negative Y directional movement.

In connection with operation and control of the laser pattern, the apparatus includes a printed circuit board 326 having a number of electrical components mounted thereon and an outlet connector 328. An outlet plug 330 communicates with the outlet connector 328 and the plug 330 includes cable 332 with electrical conducting wires. The cable 332 connects to or communicates with controller 144 in printer 111. In order to create a desired cut pattern, information provided by the controller 144 controls the electronics circuitry to cause the desired energization of the first and second servomotors to cause the ball screws 384, 300 to rotate and move the carrier, thus moving the delivery location of the laser beam 352 onto the workpiece 374. The laser system can be incorporated within the printer 111 such that standard printing functions and laser cutting can both be accomplished within the same device. Again, it should be appreciated that while details regarding one laser system are described, alternate laser systems and arrangements of lasers are employable within the printing and cutting system described herein.

Thus, a printer and associated software application that allow one to print on adhesive backed paper 100 and cut the adhesive backed paper 100 in desired locations have been disclosed. The printer may include a cutter that can create a cut through only the sticky paper, not the backing paper, and in only the locations where the operator, via software, specifies. Then, the operator may simply peel the sticker off the backing paper and apply the sticker as desired. In one embodiment, the top layer 106 may be cut without cutting the backing paper formed by bottom layer 114, however in another embodiment both layers may be cut. The software application may define the label size and shape, via user input, and the printer will then cut the adhesive-backed paper according to the defined shape and size in the software application. The operator does not have to be concerned with purchasing the right size pre-cut label paper, or having the software application line up the text with each label on the page. Instead, the user uses the software application to create the sticker size and shape that is needed and the software application communicates to the cutter equipped printer, and the printer cuts the adhesive-backed paper to size. This will create significant savings since it will no longer be necessary to buy different precut labels, waste labels from a package that go unused due to being the wrong size or shape, waste time reformatting data to fit existing template sizes, waste time through trial and error of printing and finding that a setting was incorrect, waste time retyping or cutting and pasting data that exists in one software package into another, waste time going from store to store looking for the template that best fits one's needs, etc. Additionally, the cost of the label paper may decrease since the makers will only have to produce, and stores to stock, whole sheets of adhesive backed paper. This will also make it easier for other companies to compete in this market without having to have all the software to support their individual template sizes.

A printer for connecting to a computer has been disclosed that includes a cutting mechanism for cutting media fed into the printer, wherein the printer receives instructions from software stored in the computer regarding location of cut lines for cutting the media. The media may be adhesive backed paper having a top adhesive backed layer and a bottom backing layer, and wherein the cutting mechanism cuts through the top adhesive backed layer and not the bottom backing layer. The printer may be an inkjet printer and the cutting mechanism may include a cartridge storing a chemical for scoring through the media. The chemical may be an acid that disintegrates a top adhesive backed layer of the media, but does not cut through a bottom backing layer of the media. The chemical may be a formula that is deposited on the media, and wherein the media is etched at locations of deposited formula when exposed to light. Alternatively, the cutting mechanism may include a series of stacked and pointed blades for scoring through the media. Alternatively, the cutting mechanism may be a laser.

A storage medium may be encoded with machine-readable computer program code for drawing cut lines to be sent to a printer, the storage medium including instructions for causing a computer to implement a method including providing a command tool for insertion of a cut line, wherein the cut line includes a code which makes it distinguishable from indicia to be printed, providing a command tool for drawing the cut line, and sending a signal regarding location of the cut line, relative to a media to be printed, to a printer equipped within a cutting mechanism. The storage medium may further include instructions for causing a computer to implement importing indicia to be located on the media relative to the cut line, displaying the indicia and the cut line simultaneously on a monitor, and providing a variety of drawing tools for selectively altering the size and shape of the cut line.

A system for printing and cutting a sheet of adhesive backed paper, the adhesive backed paper including a top layer for receiving printed indicia, a bottom backing layer, and adhesive interposed between the top layer and the bottom backing layer, the adhesive adhering to the top layer and releasable from the backing layer, may include a printer, the printer including a cutting mechanism for cutting the top layer, and a storage medium encoded with machine-readable computer program code for drawing cut lines to be sent to the printer, the storage medium including instructions for causing a computer to implement a method including providing a command tool for insertion of a cut line, wherein the cut line includes a code which makes it distinguishable from indicia to be printed, providing a command tool for drawing the cut line, and sending a signal regarding location of the cut line, relative to the adhesive backed paper, to the printer. The printer may receive instructions from the storage medium stored in a computer in communication with the printer regarding location of cut lines for cutting the top layer. The printer may be an inkjet printer and the cutting mechanism may include a cartridge, or pair of cartridges, storing a chemical or chemicals for scoring through the media. The chemical may be an acid that disintegrates the top layer, but does not cut through a bottom backing layer of the media. The chemical may be a formula that is deposited on the top layer, and wherein the top layer is etched at locations of deposited formula when exposed to light or other means of radiated energy. The cutting mechanism may include a series of stacked and pointed blades for scoring through the top layer. The cutting mechanism may be a laser.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, via electromagnetic radiation or wireless interface, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A printer for connecting to a computer, the printer comprising:

a cutting mechanism for cutting media fed into the printer, the cutting mechanism including a cartridge storing a chemical;

wherein the printer receives instructions from software stored in the computer regarding location of cut lines for cutting the media, the media being an adhesive backed paper having a top adhesive backed layer and a bottom backing layer, and wherein the cutting mechanism cuts though the top adhesive backed layer and not the bottom backing layer, and the chemical capable of scoring through the top adhesive backed layer.

2. The printer of claim 1 wherein the printer is an inkjet printer.

3. The printer of claim 1 wherein the cutting mechanism includes two cartridges storing chemicals that combine on the top adhesive backed layer to etch through the top adhesive backed layer.

4. The printer of claim 1 wherein the chemical is an acid that disintegrates the top adhesive backed layer.

5. The printer of claim 1 wherein the chemical is a formula that is deposited on the media, and wherein the media is etched at locations of deposited formula when exposed to light or other radiation.

* * * * *